(12) United States Patent
Revel et al.

(10) Patent No.: US 9,267,531 B2
(45) Date of Patent: Feb. 23, 2016

(54) ASSEMBLY PROVIDING A CONNECTION THAT IS SELF TIGHTENING WITH TEMPERATURE

(71) Applicant: HERAKLES, Le Haillan (FR)

(72) Inventors: Thomas Revel, Bordeaux (FR); Benoit Carrere, Le Taillan Medoc (FR); Eric Conete, Merignac (FR); Pierre Camy, Saint Medard en Jalles (FR)

(73) Assignee: HERAKLES, Le Haillan (FR)

( * ) Notice: Subject to any disclaimer, the term of this patent is extended or adjusted under 35 U.S.C. 154(b) by 0 days.

(21) Appl. No.: 14/288,498

(22) Filed: May 28, 2014

(65) Prior Publication Data

US 2014/0356094 A1 Dec. 4, 2014

(30) Foreign Application Priority Data

May 28, 2013 (FR) ...................................... 13 54818

(51) Int. Cl.
*F16B 21/00* (2006.01)
*F16B 39/02* (2006.01)
*F16B 5/02* (2006.01)
*F16B 37/14* (2006.01)

(52) U.S. Cl.
CPC ............... *F16B 39/02* (2013.01); *F16B 5/0241* (2013.01); *F16B 37/145* (2013.01)

(58) Field of Classification Search
CPC .... F16B 5/0208; F16B 5/0216; F16B 5/0241; F16B 5/0258; F16B 5/0275; F16B 21/00; F16B 37/145; F16B 39/02
USPC .............................. 411/338, 366.1, 383, 432
See application file for complete search history.

(56) References Cited

U.S. PATENT DOCUMENTS

| | | | | |
|---|---|---|---|---|
| 63,497 A | * | 4/1867 | Frank | |
| 323,508 A | * | 8/1885 | Hilton | 30/525 |
| 1,511,445 A | * | 10/1924 | Clarkson | 24/105 |
| 1,909,941 A | * | 5/1933 | Finch | 411/338 |
| 2,348,589 A | * | 5/1944 | Auten | 411/15 |
| 2,511,051 A | * | 6/1950 | Dzus | 81/451 |
| 3,414,304 A | * | 12/1968 | Miller | 403/408.1 |
| 3,459,447 A | | 8/1969 | Hurd et al. | |
| 3,462,114 A | * | 8/1969 | O'Dell, Jr. et al. | 249/195 |
| 4,671,583 A | | 6/1987 | Olson et al. | |
| 5,244,326 A | * | 9/1993 | Henriksen | 411/180 |
| 5,497,616 A | | 3/1996 | Roberts | |
| 6,012,763 A | * | 1/2000 | Clemente et al. | 296/186.4 |
| 6,405,425 B1 | | 6/2002 | Eriksson | |
| 7,344,346 B2 | * | 3/2008 | Hsu | 411/551 |
| 2006/0182513 A1 | * | 8/2006 | Dortch | 411/338 |
| 2008/0080947 A1 | * | 4/2008 | McGrade | 411/338 |

OTHER PUBLICATIONS

Search Report from corresponding French Application No. FR1354818, Jan. 15, 2014.

* cited by examiner

*Primary Examiner* — Roberta Delisle

(74) *Attorney, Agent, or Firm* — Workman Nydegger

(57) ABSTRACT

An assembly comprising first and second parts made of composite material held one against the other by at least one fastener system comprising a bolt having a flat head from which there extends a threaded portion, and a nut having a flat head from which there extends a shank including tapping suitable for co-operating with the threaded portion of the bolt. The head of the bolt bears against a countersink formed in the first part. The head of the nut bears against a countersink formed in the second part. The fastener system is suitable, during axial expansion of the fastener system, for causing each head to tilt towards the countersink in which it is housed.

20 Claims, 5 Drawing Sheets

ASSEMBLY PROVIDING A CONNECTION THAT IS SELF TIGHTENING WITH TEMPERATURE

BACKGROUND OF THE INVENTION

The invention relates to using a mechanical connection to assemble together parts made of thermostructural composite material, such as a ceramic matrix composite (CMC) material or a carbon/carbon (C/C) material, where such a material is typically constituted by a porous substrate, such as a porous fiber substrate, that is densified by a ceramic matrix. The fibers of the substrate may in particular be made of carbon or of ceramic. The matrix is made of a refractory ceramic such as, by way of example: a refractory carbide, nitride, boride, or oxide. Thermostructural composite materials are remarkable because of their mechanical properties that make them suitable for constituting structural elements, and because of their ability to conserve these properties at high temperatures.

The invention relates more particularly to the aerodynamic and thermal behavior of mechanical connections used for assembling together parts made of thermostructural composite material when the parts are to be immersed in a high-temperature stream, for example as when fabricating all or part of afterbody assemblies for aeroengines such as exhaust cones (also known as "exhaust plugs"), or flaps for a variable-section nozzle.

In these applications, the parts for assembling together are generally relatively fine (thickness of a few millimeters), and they need to satisfy aerodynamic requirements, which means that it is preferred to use rivets for making the mechanical connections between the parts. With assemblies used for making aeroengine afterbody parts, it is general practice to use rivets that present on one side of the assembly a flat head (i.e. a head of frustoconical shape with an end that is flat) that is received in a countersink formed in one of the parts to be assembled together, and on the other side, a column or a washer serving to take up differential expansion between rivets, which expand considerably, and the parts made of thermostructural composite material, which expand little. By incorporating the head of the rivet in a countersink present on one side of the assembly, it is possible to obtain good aerodynamic performance, but only on that side of the assembly, since the presence of the column and of a portion of the body of the rivet on the other side of the assembly gives rise to considerable drag.

Another solution, which is used in making flaps for a variable section nozzle, consists in connecting the parts made of thermostructural composite material together with rivets, such as those sold under the trademark Fybrfast®, which rivets have at one end a head and at the other end an end portion that is pressed and flattened in order to fasten the parts together. Nevertheless, with that type of rivet, the head and the flattened portion of the body of the rivet project from either side of the assembly and consequently they project beyond the streamlining of the assembly.

OBJECT AND SUMMARY OF THE INVENTION

An object of the invention is to propose a solution for assembling together parts made of composite material using one or more fastener systems that present a coefficient of thermal expansion that is greater than the coefficient of thermal expansion of the parts made of composite material, it being necessary for the fastener system to have little or no impact on the aerodynamic performance of the assembly.

This object is achieved with an assembly comprising first and second parts made of composite material held one against the other by at least one fastener system comprising a bolt having a flat head from which there extends a threaded portion, and a nut having a flat head from which there extends a shank including tapping suitable for co-operating with the threaded portion of the bolt, the head of the bolt bearing against a countersink formed in the first part, the head of the nut bearing against a countersink formed in the second part, the fastener system being suitable, during axial expansion of said fastener system, for causing at least one of the two heads to tilt towards the countersink in which it is housed.

Thus, the assembly of the invention is made with mechanical connections that are integrated in both sides of the connection, i.e. they do not project beyond the outside surfaces of the assembled-together parts. Consequently, the assembly of the invention can be immersed on both sides in a high-temperature stream without the connection systems degrading aerodynamic performance.

Also, the fastener system used is designed to apply an additional holding force by at least one of the heads of the system tilting during rises in temperature, thus making it possible to compensate for expansion, in particular axial expansion, of each of the fastener systems and to conserve a clamping force when hot.

In an embodiment of the assembly in accordance with the invention, at least one of the flat heads of the fastener system includes a plurality of radial slots and presents an angle greater than the angle of the countersink of the part in which it is housed, the head in question being held in prestress in said countersink. Thus, when the assembly is exposed to a high-temperature stream, the fastener system expands and the head, which was previously in a prestressed condition, then tilts towards the countersink in which it is received. By tilting in this way, the head then exerts additional forces that make it possible for the fastener system, while hot, to maintain the clamping force it exerts on the parts.

In an aspect of the assembly of the invention, the bolt and the nut are made of a material selected from at least one of the following materials: Inconel® 625 or 718, Waspaloy®, Haynes® 282®, A286 stainless steel, and any other high-performance steel.

In another embodiment of the invention the fastener system includes a peg extending inside the fastener system between the head of the bolt and the head of the nut, the peg presenting a coefficient of thermal expansion that is greater than the coefficient of thermal expansion of the bolt and of the nut. Thus, when the assembly is subjected to high temperatures, e.g. when it is immersed in a hot stream of combustion gas, the peg expands more strongly than does the fastener system, and it exerts thrust forces via its bottom and top ends respectively against the internal portions of the heads of the bolt and of the nut. During the axial expansion of the peg, the heads then tilt towards the countersinks in which they are received and each of them exerts forces on the parts that make it possible for the fastener system, while hot, to maintain the clamping force it exerts on the parts.

In an aspect of the assembly of the invention, the bolt and the nut are made of Inconel® 718 ($CTE_{600°\,C.}=14.8$), while the peg is made of A286 stainless steel (formula 26NCT25 and $CTE_{600°\,C.}=18$). In a like aspect of the assembly of the invention, the bolt and the nut are made of titanium ($CTE_{600°\,C.}=9.9$), while the peg is made of Waspaloy® ($CTE_{600°\,C.}=14.6$).

In another aspect of the assembly of the invention, both the head of the bolt and the head of the nut include respective slots. The slots facilitate elastic deformation of said heads during the expansions and the contractions of the peg.

In another aspect of the assembly of the invention, the first and second parts are made of ceramic matrix composite material.

In yet another aspect of the assembly of the invention, each of the first and second parts presents thickness of less than 3 millimeters (mm).

Still in another aspect of the assembly of the invention, the first and second parts are parts of an afterbody of an aeroengine.

BRIEF DESCRIPTION OF THE DRAWINGS

Other characteristics and advantages invention appear from the following description of particular embodiments of the invention, given as non-limiting examples and with reference to the accompanying drawings, in which.

DETAILED DESCRIPTION OF EMBODIMENTS

The present invention applies in general manner to any assembly between parts made of composite material using one or more fastener systems that present a coefficient of thermal expansion that is greater than the coefficient of thermal expansion of the parts made of composite material, it being necessary for the fastener system to have little or no impact on the aerodynamic performance of the assembly.

The parts for assembling together may be made in particular out of thermostructural ceramic matrix composite (CMC) material, i.e. out of a material constituted by reinforcement made of refractory fibers (carbon or ceramic) densified by a ceramic matrix that is likewise refractory, i.e. materials such as C/SiC, SiC/SiC, C/C-SiC, etc. The parts could also be made of other thermostructural composite materials presenting a low coefficient of thermal expansion, such as C/C materials (reinforcement and matrix both made of carbon).

The assembly of the invention is particularly, but not exclusively, for use in making all or part of afterbody assemblies of aeroengines such as exhaust cones (also known as "exhaust plugs") or flaps for variable-section nozzles.

Figure 1:
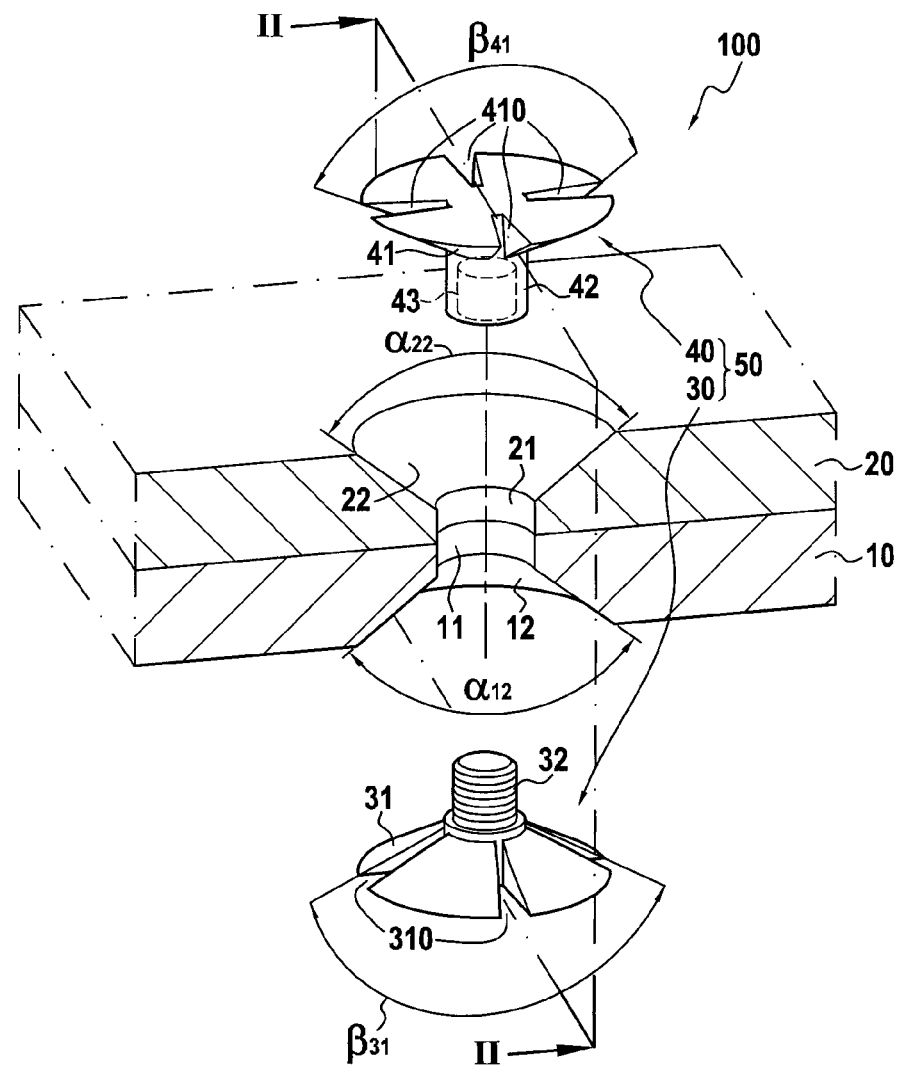
FIG. 1 is a diagrammatic perspective view showing an assembly being made in accordance with an embodiment of the invention.

FIGS. 1, 2A, 2B, 3A, and 3B show an assembly in accordance with an embodiment of the invention. As shown in FIG. 1, an assembly 100 between two parts 10 and 20 made of thermostructural CMC material is itself made by means of a fastener system 50 comprising a bolt 30 and a nut 40 that are placed in orifices 11 and 21 formed in the parts 10 and 20. More precisely, the bolt 30 has a flat head 31 from which there extends a threaded portion 32, the flat head 31 being received in a countersink 12 formed in the part 10. The nut 40 also has a flat head 41 from which there extends a shank 42 having tapping 43 for co-operating with the threaded portion 32 of the bolt 30. The flat head 41 of the nut 40 is received in a countersink 22 formed in the part 20. In particular, the nut and the bolt may be made out of any one of the following materials: Inconel® 625 or 718, Waspaloy®, Haynes® 282®, A286 stainless steel, and any other high-performance steel.

Figure 2A:
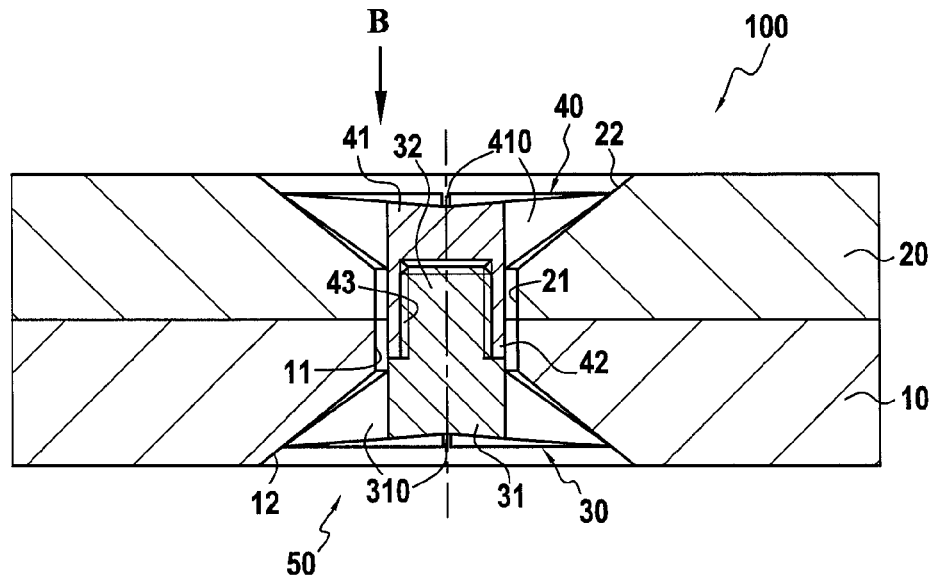
FIGS. 2A and 2B are respectively a diagrammatic section view and a diagrammatic plan view showing the FIG. 1 assembly when cold.
Figure 2B:
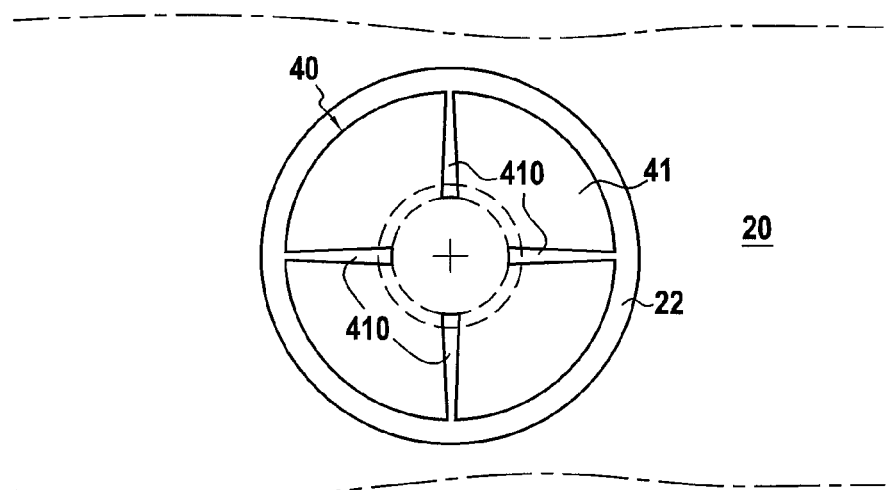

In the presently described embodiment, each of the flat heads 31 and 41 has a plurality of radial slots 310 and 410. Also, the flat head 31 of the bolt 30 presents an angle $\beta_{31}$ that is greater than the angle $\alpha_{12}$ of the countersink 12 in which it is to be received. Likewise, the flat head 41 of the nut 40 presents an angle $\beta_{41}$ that is greater than the angle $\alpha_{22}$ of the countersink 22 in which it is to be received. As shown in FIGS. 2A and 2B, the bolt 30 is screwed into the nut 40 with a clamping force that enables the flat heads 31 and 41 to be put into pre-stress in their respective countersinks 12 and 22. In this prestressed state, the heads 31 and 41 are elastically deformed because of the presence of the slots 310 and 410.

Figure 3A:
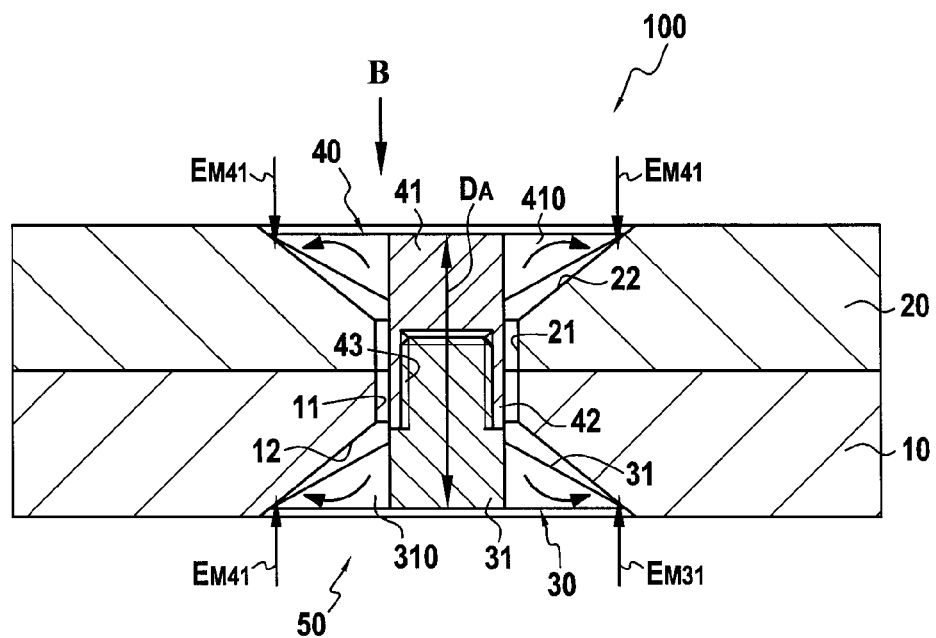
FIGS. 3A and 3B are respectively a diagrammatic section view and a diagrammatic plan view showing the FIG. 1 assembly when it is exposed to a high-temperature stream.
Figure 3B:
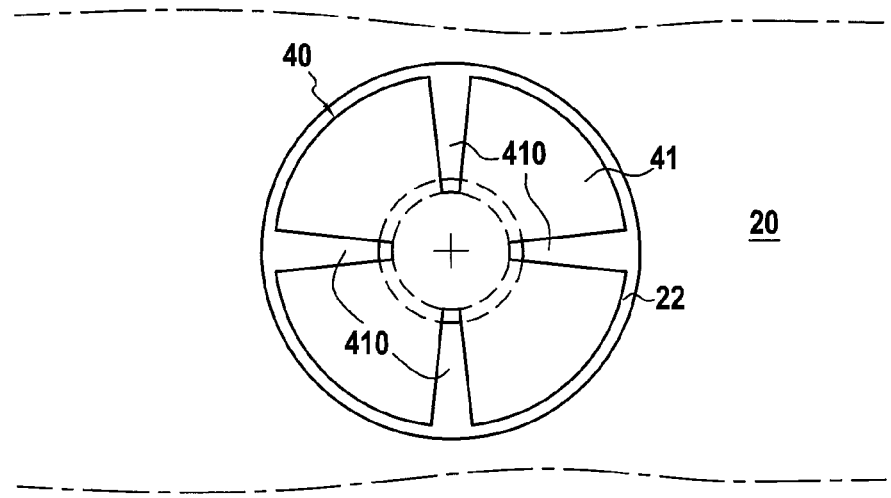

When the assembly 100 is subjected to high temperatures, e.g. when it is immersed in a hot stream of combustion gas, the fastener system expands, in particular in an axial direction $D_A$ as shown in FIG. 3A. The flat heads 31 and 41 that were previously prestressed in their respective countersinks 12 and 22 then tilt towards the countersinks in which they are received during the axial expansion of the fastener system. The slots 310 and 410 are then in their rest configuration as shown for the slots 410 in the head 41 in FIG. 3B. The heads 31 and 41 then exert respective forces $E_{M31}$ and $E_{M41}$ on the parts 10 and 20 that make it possible for the fastener system, while hot, to maintain the clamping force it exerts on the parts. Once cooled, the assembly 100 returns to the cold configuration shown in FIGS. 2A and 2B.

Figure 4:
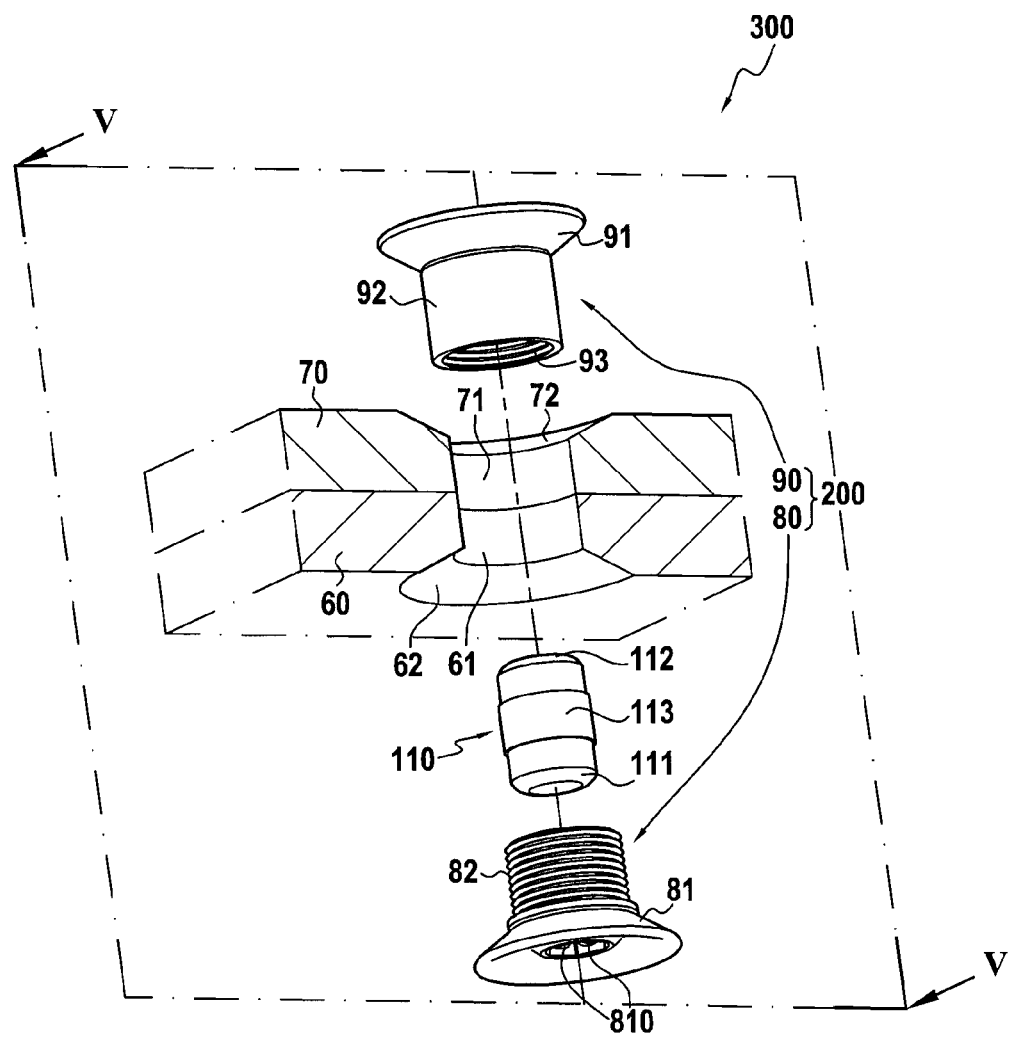
FIG. 4 is a diagrammatic perspective view showing an assembly being made in accordance with an embodiment of the invention.
Figure 5:
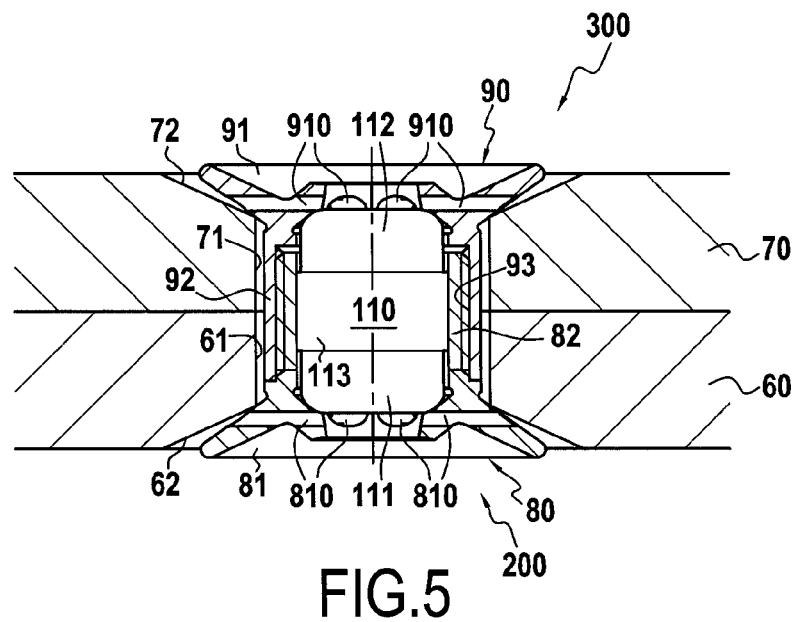
FIG. 5 is a diagrammatic section view showing the FIG. 4 assembly when cold.
Figure 6:
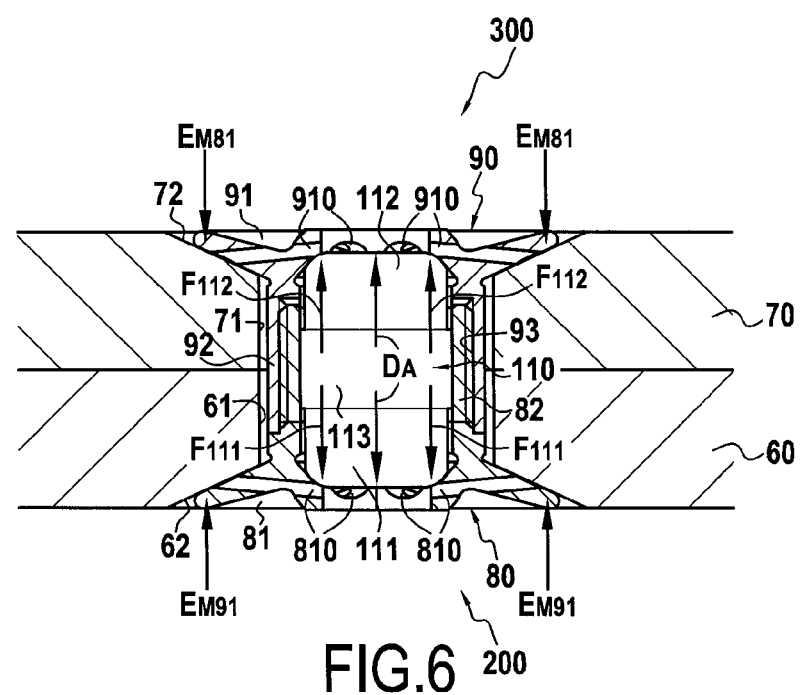
FIG. 6 is a diagrammatic section view showing the FIG. 4 assembly when it is exposed to high temperatures.

FIGS. 4, 5, and 6 show an assembly in accordance with another embodiment of the invention. As shown in FIG. 4, an assembly 300 between two parts 60 and 70 made of thermostructural CMC material is itself made by means of a fastener system 200 comprising a bolt 80 and a nut 90 that are placed in orifices 61 and 71 formed in the parts 60 and 70. More precisely, the bolt 80 has a flat head 81 from which there extends a threaded portion 82, the flat head 81 being received in a countersink 62 formed in the part 60. The nut 90 also has a flat head 91 from which there extends a shank 92 having tapping 93 for co-operating with the threaded portion 82 of the bolt 80. The flat head 91 of the nut 90 is received in a countersink 72 formed in the part 70.

In the presently described embodiment, a peg 110 is also inserted in the internal volume 101 defined between the bolt 80 and the nut 90 when the fastener system 200 is assembled (FIG. 5). The peg 110 is dimensioned so as to be in contact with the heads 81 and 91 of the bolt 80 and of the nut 90. More precisely, the bottom end 111 of the peg 110 is in contact with an internal portion 810 of the head 81 of the bolt 80 situated level with its portion joining the threaded portion 82, while the top end 112 of the peg 110 is in contact with an internal portion 910 of the head 91 of the nut 90 level with its portion joining the shank 92.

The peg 110 presents a coefficient of thermal expansion (CTE) that is greater than the coefficient of thermal expansion of the bolt 80 and of the nut 90. Thus, when the assembly 300 is subjected to high temperatures, e.g. when it is immersed in a hot stream of combustion gas, the peg 110 expands more strongly than does the fastener system 200, and it exerts thrust forces $F_{111}$ and $F_{112}$ via its bottom and top ends 111 and 112 respectively against the internal portions 810 and 910 of the heads 81 and 91 (FIG. 6). The heads 81 and 91 are then tilted towards the countersink in which they are received during axial expansion of the peg 110. The heads 81 and 91 then exert respective forces $E_{M81}$ and $E_{M91}$ on the parts 60 and 70 that make it possible for the fastener system, while hot, to maintain the clamping force it exerts on the parts. Once cooled, the assembly 100 returns to the cold configuration shown in FIG. 5.

By way of non-limiting example, the bolt and the nut may be made of Inconel® 718 ($CTE_{600°\,C.}$=14.8), while the peg is made of A286 stainless steel (formula 26NCT25 and $CTE_{600°\,C.}$=18). In another non-limiting variant, the bolt and the nut are made of titanium ($CTE_{600°\,C.}$=9.9), while the peg is made of Waspaloy® ($CTE_{600°\,C.}$=14.6).

In the presently described embodiment, the peg 110 also has a central shoulder 113 that enables it to be held in position in the internal volume 101 and that makes it possible to balance the thrust forces that it exerts on the heads 81 and 91. Also, in the presently described embodiment, each of the heads 81 and 91 includes respective slots 810 and 910 that facilitate elastic deformation of said heads during expansions and contractions of the peg 110.

The invention claimed is:

1. An assembly comprising first and second parts made of composite material held one against the other by at least one fastener system comprising:
    a bolt having a flat head from which there extends a threaded portion, and
    a nut having a flat head from which there extends a shank including tapping suitable for co-operating with the threaded portion of the bolt,
    the head of the bolt bearing against a countersink formed in the first part,
    the head of the nut bearing against a countersink formed in the second part,
    the fastener system being suitable, during axial expansion of said fastener system, for causing at least one of the two heads to tilt towards the countersink in which it is housed,
    wherein at least one of the flat heads of the fastener system presents an angle ($\beta_{31}$; $\beta_{41}$), and during axial expansion of said fastener system, the angle ($\beta_{31}$; $\beta_{41}$) is increased thereby allowing said tilt towards the countersink.

2. An assembly according to claim 1, wherein said angle ($\beta_{31}$; $\beta_{41}$) presented by at least one of the flat heads of the fastener system is greater than the angle ($\alpha_{12}$, $\alpha_{22}$) of the countersink of the part in which said flat head is housed.

3. An assembly according to claim 1, wherein the fastener system includes a peg extending inside said fastener system between the head of the bolt and the head of the nut and wherein the peg presents a coefficient of thermal expansion that is greater than the coefficient of thermal expansion of the bolt and of the nut.

4. An assembly according to claim 3, wherein the bolt and the nut are made of Inconel® 718 ($CTE_{600°\,C.}$=14.8) and in that the peg is made of A286 stainless steel (formula 26NCT25 and $CTE_{600°\,C.}$=18).

5. An assembly according to claim 3, wherein the bolt and the nut are made of titanium ($CTE_{600°\,C.}$=9.9), while the peg is made of Waspaloy® ($CTE_{600°\,C.}$=14.6).

6. An assembly according to claim 1, wherein both the head of the bolt and the head of the nut include respective slots.

7. An assembly according to claim 1, wherein the first and second parts are made of ceramic matrix composite material.

8. An assembly according to claim 1, wherein each of the first and second parts presents thickness of less than 3 mm.

9. An assembly according to claim 1, wherein the first and second parts are parts of an afterbody of an aeroengine.

10. An assembly according to claim 1, wherein for at least one of the flat heads of the fastener system, the angle ($\beta_{31}$; $\beta_{41}$) presented by said flat head is greater than an angle ($\alpha_{12}$, $\alpha_{22}$) presented by the corresponding countersink of the part in which said flat head is housed.

11. An assembly according to claim 1, wherein at least one of the flat heads of the fastener system includes a plurality of radial slots that are configured to facilitate elastic deformation of said at least one of the flat heads.

12. An assembly according to claim 1, wherein at least one flat head is held in prestress in the corresponding countersink of the part in which said flat head is housed.

13. An assembly according to claim 12, wherein during axial expansion of said fastener system, a width of at least one slot of said plurality of slits decreases.

14. An assembly according to claim 1, wherein at least one of the flat heads of the fastener system includes a plurality of radial slots, and said flat head is held in prestress in the corresponding countersink of the first or second part in which said flat head is housed, wherein in said prestressed state, the flat head is elastically deformed because of the presence of said plurality radial slots.

15. An assembly according to claim 1, wherein the bolt or the nut or both are made of a material including a nickel-chromium alloy including molybdenum and niobium.

16. An assembly according to claim 1, wherein the bolt or the nut or both are made of a material including a nickel-chromium alloy.

17. An assembly according to claim 1, wherein the bolt or the nut or both are made of a material including an age-hardened nickel-molybdenum-chromium alloy.

18. An assembly according to claim 1, wherein the bolt or the nut or both are made of a material including a nickel-chromium superalloy including cobalt and molybdenum.

19. An assembly according to claim 1, wherein the bolt or the nut or both are made of a material including A286 stainless steel.

20. An assembly according to claim 1, wherein the bolt or the nut or both are made of a material including high-performance steel.

* * * * *